May 20, 1941.  J. W. CARPENTER  2,242,451
METHOD OF TREATING MEAT
Filed Dec. 28, 1939
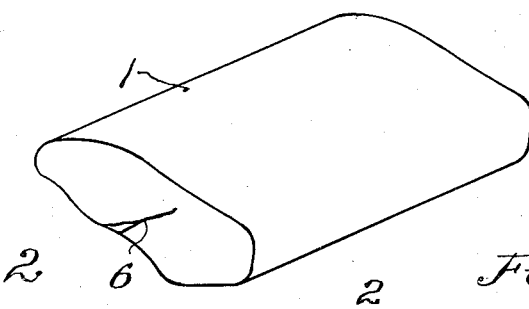
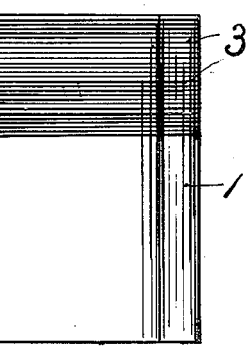
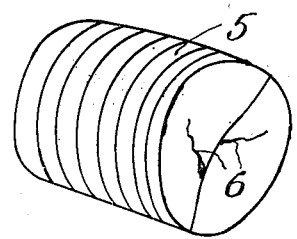
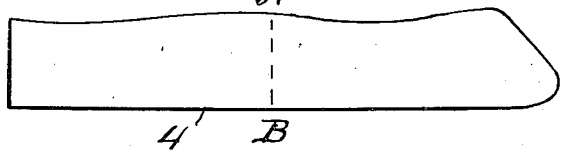
INVENTOR.
John W. Carpenter
BY Warren D. House
His ATTORNEY.

Patented May 20, 1941

2,242,451

UNITED STATES PATENT OFFICE 2,242,451

METHOD OF TREATING MEAT

John W. Carpenter, Independence, Mo.

Application December 28, 1939, Serial No. 311,302

7 Claims. (Cl. 99—107)

My invention relates to improvements in methods of treating meat.

One of the objects of my invention is the provision of a novel method of treating fresh meat, such as rounds of beef and loins of beef or pork, for example, for the production of steaks of desired thicknesses, which steaks will have a maximum of tenderness, and will retain a maximum of the natural juices of the meat.

A further object of my invention is the provision of a novel method of treating fresh meat, which is simple, easy to carry into effect, which will produce steaks with the fatty streaks more evenly distributed therethrough than they are in the usual steaks, and which is efficient in its operation.

The novel features of my invention are hereinafter fully described and shown.

In the accompanying drawing, which is illustrative of my invention,

Fig. 1 is a perspective view of a usual top round of beef prepared for the freezing step of my improved method.

Fig. 2 is a plan view of the same while frozen and partly sliced.

Fig. 3 is an edge view of some of the frozen slices of the top round shown in Fig. 2 assembled into a pack flatwise one upon the other to form a steak of desired thickness.

Fig. 4 is a side elevation of a boned and trimmed usual pork loin.

Fig. 5 is a perspective view of the loin shown in Fig. 4, transversely bisected and the two portions disposed lengthwise side by side, with their ends reversed, and formed into a roll ready to be subjected to the freezing step of my improved method.

In producing steaks from a usual round of fresh beef, in accordance with my improved method, the round is boned and trimmed and the top round 1 therefrom, shown in Fig. 1, is frozen solid by subjecting it for between 18 to 36 hours to a temperature of zero to 10 below, Fahrenheit. This freezing operation renders the meat very tender and retains the natural juice therein.

The top round, which so frozen, is sliced, preferably thinly, as shown in Fig. 2, and several slices are disposed flatwise one upon the other, of a number to form a pack, shown in Fig. 3, making a steak of desired thickness, designated by 2.

The slices 3 of the pack 2 are thawed, upon which they at once adhere to each other around their edges and sides, thus forming a sealed in unitary structure that makes a tender steak with the natural juices retained therein.

In treating a usual pork loin by my improved method, the loin 4, Fig. 4 is boned and trimmed, and then transversely bisected, as on the dotted line A—B of Fig. 4. The two portions of the loin are then disposed lengthwise side by side, with their ends reversed, and formed into a roll 5, Fig. 5. The roll 5 is then frozen solid by subjecting to a temperature of zero to 10 below, Fahrenheit, for between 18 to 36 hours. The roll is then thinly sliced, while frozen, and the slices formed into packs of desired thicknesses, in the manner hereinbefore described with reference to making the round steak packs.

Loins of beef under my improved method are treated similarly to the above described treatment of pork loins.

The important features of my improved method comprise the freezing of the body of meat at the low temperature named and keeping it so frozen for the time designated, to make it tender; the slicing of it while it is so frozen, to retain therein the juice; and the assembling the slices into packs of desired thicknesses and allowing the slices in the packs to thaw and seal together to still retain the juice in the resulting steaks.

By disposing in different circumferential positions, as by reversing end for end alternate slices 3, in forming the pack 2, streaks of fat 6, Fig. 1, in the top round, are more evenly distributed in the steak produced by the pack of slices.

In like manner, the disposing of the two portions of the loin 4 end for end and lengthwise side by side more evenly distributes the fatty streaks 6 in the steaks formed from the roll 5, Fig. 5.

Many modifications of my invention, within the scope of the appended claims, may be made without departing from the spirit of my invention.

By bisecting the loin, disposing the two portions lengthwise side by side with their ends reversed, and forming them into a roll, which is frozen solid and then sliced, the single slicing operations are reduced about one half; second, the steaks produced are larger and more uniform in size and shape; and third, due to one end of the loin being much fatter than the other end, the assembling of the portions into a roll with their ends reversed, more evenly distributes the fat in the steaks formed by the packs of slices.

What I claim is:

1. The method of treating meat, consisting in freezing solid a body of meat, and, without tempering, slicing it, disposing the solidly frozen slices flatwise one upon the other, of a number to form a pack of desired thickness, and thawing the slices of the pack to enable them to adhere to each other and form a sealed in unitary structure with the juice retained therein.

2. The method of treating meat, consisting in freezing a body of meat between 18 to 36 hours at a temperature between zero and 10 below, Fahrenheit, and, without tempering, slicing it, disposing the solidly frozen slices flatwise one upon the other, of a number to form a pack of desired thickness, and thawing the slices of the pack to enable them to adhere to each other and form a sealed in unitary structure with the juice retained therein.

3. The method of treating meat, consisting in freezing a body of meat between 18 to 36 hours at a temperature between zero and 10 below, Fahrenheit, and without tempering, slicing it, disposing the solidly frozen slices in different circumferential positions, flatwise one upon the other, of a number to form a pack of desired thickness, and thawing the slices of the pack to enable them to adhere to each other and form a sealed in unitary structure with the juice retained therein.

4. The method of treating a loin of meat, consisting in transversely besecting the loin, forming the two portions, with their ends reversed, into a roll, freezing solid said roll, and, while it is frozen, slicing it, disposing the slices flatwise one upon the other, of a number to form a pack of desired thickness, and thawing the slices of the pack to enable them to adhere to each other and form a sealed in structure with the juice retained therein.

5. The method of treating a loin of meat, consisting in transversely bisecting the loin, forming the two portions, disposed lengthwise side by side, into a roll, freezing solid said roll, and, while it is frozen, slicing it, disposing the slices flatwise one upon the other, of a number to form a pack of desired thickness, and thawing the slices of the pack to enable them to adhere together and form a sealed in unitary structure with the juice retained therein.

6. The method of treating a loin of meat, consisting in transversely bisecting the loin, forming the two portions, disposed lengthwise side by side, into a roll, freezing said roll between 18 to 36 hours at a temperature between zero and 10 below, Fahrenheit, and, without tempering, slicing it, disposing the solidly frozen slices flatwise one upon the other, of a number to form a pack of desired thickness, and thawing the slices of the pack to enable them to adhere to each other and form a sealed in unitary structure with the juice retained therein.

7. The method of treating a loin of meat, consisting in transversely bisecting the loin, forming the two portions, with their ends reversed and disposed lengthwise side by side, into a roll, freezing said roll between 18 to 36 hours at a temperature between zero and 10 below, Fahrenheit, and, while it is frozen, slicing it, disposing the slices flatwise one upon the other, of a number to form a pack of desired thickness, and thawing the slices of the pack to enable them to adhere to each other and form a sealed in unitary structure with the juice retained therein.

JOHN W. CARPENTER.